(12) United States Patent
Sasaki et al.

(10) Patent No.: US 8,760,809 B1
(45) Date of Patent: Jun. 24, 2014

(54) THERMALLY-ASSISTED MAGNETIC RECORDING HEAD HAVING A PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/892,858

(22) Filed: May 13, 2013

(51) Int. Cl.
  *G11B 5/127* (2006.01)
  *G11B 11/00* (2006.01)

(52) U.S. Cl.
  USPC ............... 360/125.31; 369/13.33; 369/59

(58) Field of Classification Search
  USPC ............................ 360/59, 125.3, 125.31
  See application file for complete search history.

(56) References Cited

U.S. PATENT DOCUMENTS

| | | | |
|---|---|---|---|
| 7,957,085 B2 * | 6/2011 | Tanaka et al. ............... 360/59 |
| 8,130,599 B2 * | 3/2012 | Komura et al. ............ 369/13.33 |
| 8,248,892 B2 * | 8/2012 | Shimazawa et al. ........ 369/13.32 |
| 8,295,003 B2 * | 10/2012 | Chou et al. ..................... 360/59 |
| 8,325,441 B2 * | 12/2012 | Sasaki et al. ............. 360/125.74 |
| 8,325,570 B1 * | 12/2012 | Tanaka et al. .............. 369/13.33 |
| 8,339,739 B2 * | 12/2012 | Balamane et al. ......... 360/125.3 |
| 8,349,198 B2 * | 1/2013 | Araki et al. ..................... 216/24 |
| 8,416,530 B2 * | 4/2013 | Gao et al. ................. 360/125.31 |
| 8,427,927 B1 * | 4/2013 | Chou et al. ............... 369/112.27 |
| 8,482,879 B1 * | 7/2013 | Sasaki et al. ............. 360/123.03 |
| 8,488,419 B1 * | 7/2013 | Jin et al. .................... 369/13.32 |
| 8,503,270 B1 * | 8/2013 | Kawamori et al. ........ 369/13.33 |
| 2005/0135008 A1 * | 6/2005 | Challener et al. ............. 360/128 |
| 2011/0058272 A1 * | 3/2011 | Miyauchi et al. ............... 360/59 |
| 2011/0157738 A1 * | 6/2011 | Shimazawa et al. ............ 360/59 |
| 2011/0164333 A1 * | 7/2011 | Sasaki et al. .................... 360/59 |
| 2011/0170381 A1 | 7/2011 | Matsumoto |
| 2011/0205661 A1 * | 8/2011 | Komura et al. ................. 360/59 |
| 2011/0228420 A1 * | 9/2011 | Hara et al. ...................... 360/59 |
| 2011/0242697 A1 * | 10/2011 | Mori et al. ...................... 360/59 |
| 2011/0286128 A1 * | 11/2011 | Tsutsumi et al. ............... 360/59 |
| 2011/0292537 A1 * | 12/2011 | Jin et al. .......................... 360/59 |

* cited by examiner

*Primary Examiner* — Brian Miller
(74) *Attorney, Agent, or Firm* — Oliff PLC

(57) ABSTRACT

A thermally-assisted magnetic recording head includes a main pole, a waveguide, and a plasmon generator. The waveguide includes a core and a cladding. The plasmon generator is configured to excite a surface plasmon based on light propagating through the core. The plasmon generator has a front end face located in a medium facing surface, and a first inclined surface connected to the front end face and facing toward the medium facing surface. The main pole includes an interposition part interposed between the first inclined surface and the medium facing surface. The interposition part has a second inclined surface that is opposed to the first inclined surface with an insulating film interposed therebetween.

6 Claims, 10 Drawing Sheets

THERMALLY-ASSISTED MAGNETIC RECORDING HEAD HAVING A PLASMON GENERATOR

BACKGROUND OF THE INVENTION

1. Field of the Invention

The present invention relates to a thermally-assisted magnetic recording head for writing data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, a thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near a medium facing surface of the slider.

The plasmon generator has a front end face located in the medium facing surface. The front end face generates near-field light. Surface plasmons that are excited on the plasmon generator propagate along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a technology in which the surface of a waveguide and the surface of a metallic structure (plasmon generator) are arranged to face each other with a gap therebetween, and evanescent light that occurs at the surface of the waveguide based on the light propagating through the waveguide is used to excite surface plasmons on the metallic structure, so that near-field light is generated based on the excited surface plasmons. Further, U.S. Patent Application Publication No. 2011/0170381 A1 discloses forming a part of the metallic structure from a material different from that of other parts of the metallic structure.

Materials that are typically employed for plasmon generators are metals having high electrical conductivities, such as Au and Ag. However, Au and Ag are relatively soft and have relatively high thermal expansion coefficients. Thus, plasmon generators that are formed of Au or Ag have disadvantages described below.

In the process of manufacturing a thermally-assisted magnetic recording head, the medium facing surface is formed by polishing. During polishing, polishing residues of metal materials may grow to cause smears. To remove the smears, the polished surface is slightly etched by, for example, ion beam etching in some cases. For a plasmon generator formed of Au or Ag, the polishing and etching may damage the front end face and may thereby cause the front end face to be significantly recessed relative to the other parts of the medium facing surface. In such a case, the front end face of the plasmon generator becomes distant from the recording medium, and the heating performance of the plasmon generator is thus degraded.

Part of the energy of light guided to the plasmon generator through the waveguide is transformed into heat in the plasmon generator. Part of the energy of near-field light generated by the plasmon generator is also transformed into heat in the plasmon generator. The plasmon generator thus increases in temperature during the operation of the thermally-assisted magnetic recording head. As the plasmon generator formed of Au or Ag increases in temperature, it expands and significantly protrudes toward the recording medium. As a result, a protective film covering the medium facing surface may come into contact with the recording medium. This may cause damage to the recording medium or cause the protective film to be broken. When the protective film is broken, the front end face of the plasmon generator may be damaged by contact with the recording medium or may be corroded by contact with high temperature air.

Further, the plasmon generator formed of Au or Ag may be deformed due to aggregation as its temperature increases. In addition, such a plasmon generator expands as its temperature increases and then contracts as its temperature decreases. When the plasmon generator undergoes such a process, the front end face of the plasmon generator may be significantly recessed relative to the other parts of the medium facing surface. In such a case, the heating performance of the plasmon generator is degraded as mentioned above.

For the various reasons described above, the plasmon generator formed of Au or Ag has the drawback of being low in reliability.

OBJECT AND SUMMARY OF THE INVENTION

It is an object of the present invention to provide a thermally-assisted magnetic recording head that offers increased reliability of a plasmon generator.

A thermally-assisted magnetic recording head of the present invention includes a medium facing surface facing a recording medium, a main pole producing a write magnetic field for writing data on the recording medium, a waveguide, a plasmon generator, and an insulating film. The waveguide includes a core through which light propagates, and a cladding provided around the core. The plasmon generator is configured to excite a surface plasmon based on the light propagating through the core. The insulating film is disposed between the main pole and the plasmon generator. The main pole and the plasmon generator are aligned along the direction of travel of the recording medium.

The plasmon generator has a front end face located in the medium facing surface, and a first inclined surface connected to the front end face and facing toward the medium facing surface. The front end face generates near-field light based on the surface plasmon. The first inclined surface is inclined relative to a direction perpendicular to the medium facing surface, and has a first edge located in the medium facing surface and a second edge farthest form the medium facing surface. In a region between the medium facing surface and a virtual plane that passes through the second edge and is parallel to the medium facing surface, the thickness of the plasmon generator in the direction of travel of the recording medium increases with increasing distance from the medium facing surface. The main pole includes an interposition part interposed between the first inclined surface and the medium facing surface. The interposition part has a second inclined surface that is opposed to the first inclined surface with the insulating film interposed therebetween. The second inclined surface is inclined relative to the direction perpendicular to the medium facing surface.

In the thermally-assisted magnetic recording head of the present invention, the core may have an evanescent light generating surface that generates evanescent light based on the light propagating through the core. In this case, the plasmon generator may further have a core facing surface that is opposed to the evanescent light generating surface with a portion of the cladding interposed therebetween.

In the thermally-assisted magnetic recording head of the present invention, the plasmon generator may be disposed between the core and the main pole.

In the thermally-assisted magnetic recording head of the present invention, the plasmon generator may include a first metal layer, a second metal layer, and an intermediate layer. The intermediate layer is interposed between the first metal layer and the second metal layer. Each of the first metal layer, the second metal layer and the intermediate layer has an end located in the front end face. Each of the first and second metal layers is formed of a metal material. The intermediate layer is formed of a material that is higher in Vickers hardness than the metal material used to form the first metal layer and the metal material used to form the second metal layer.

In the thermally-assisted magnetic recording head of the present invention, the plasmon generator may have a first portion including the front end face and the first inclined surface, and a second portion coupled to the first portion. In this case, no part of the second portion may be exposed in the medium facing surface. Further, in this case, the first portion may include a first metal layer, a second metal layer, and an intermediate layer. The intermediate layer is interposed between the first metal layer and the second metal layer. Each of the first metal layer, the second metal layer and the intermediate layer has an end located in the front end face. Each of the first and second metal layers is formed of a metal material. The intermediate layer is formed of a material that is higher in Vickers hardness than the metal material used to form the first metal layer and the metal material used to form the second metal layer.

In the thermally-assisted magnetic recording head of the present invention, in the region between the medium facing surface and the aforementioned virtual plane, the thickness of the plasmon generator in the direction of travel of the recording medium increases with increasing distance from the medium facing surface. This feature of the present invention allows the plasmon generator to be large in volume and surface area to thereby suppress a temperature rise of the plasmon generator, while allowing the front end face of the plasmon generator to be small in area to thereby prevent the front end face from being damaged. Further, in the present invention, the main pole includes the interposition part interposed between the first inclined surface of the plasmon generator and the medium facing surface. This makes it possible that the main pole facilitates dissipation of heat from the plasmon generator, and the interposition part protects a portion near the front end face of the plasmon generator. Consequently, the present invention is able to increase the reliability of the plasmon generator.

Other and further objects, features and advantages of the present invention will appear more fully from the following description.

DETAILED DESCRIPTION OF THE PREFERRED EMBODIMENTS

First Embodiment

Figure 4:
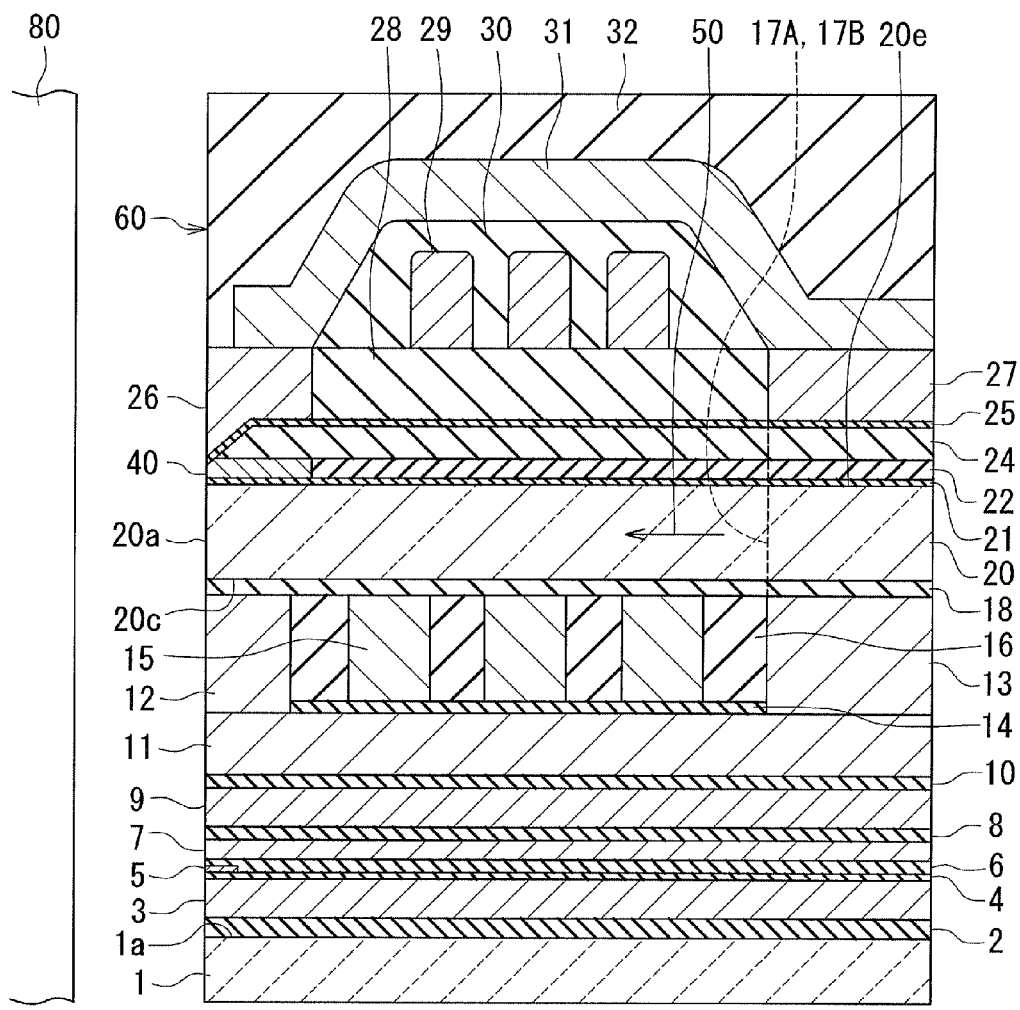
FIG. 4 is a cross-sectional view showing the configuration of the thermally-assisted magnetic recording head according to the first embodiment of the invention.
Figure 5:
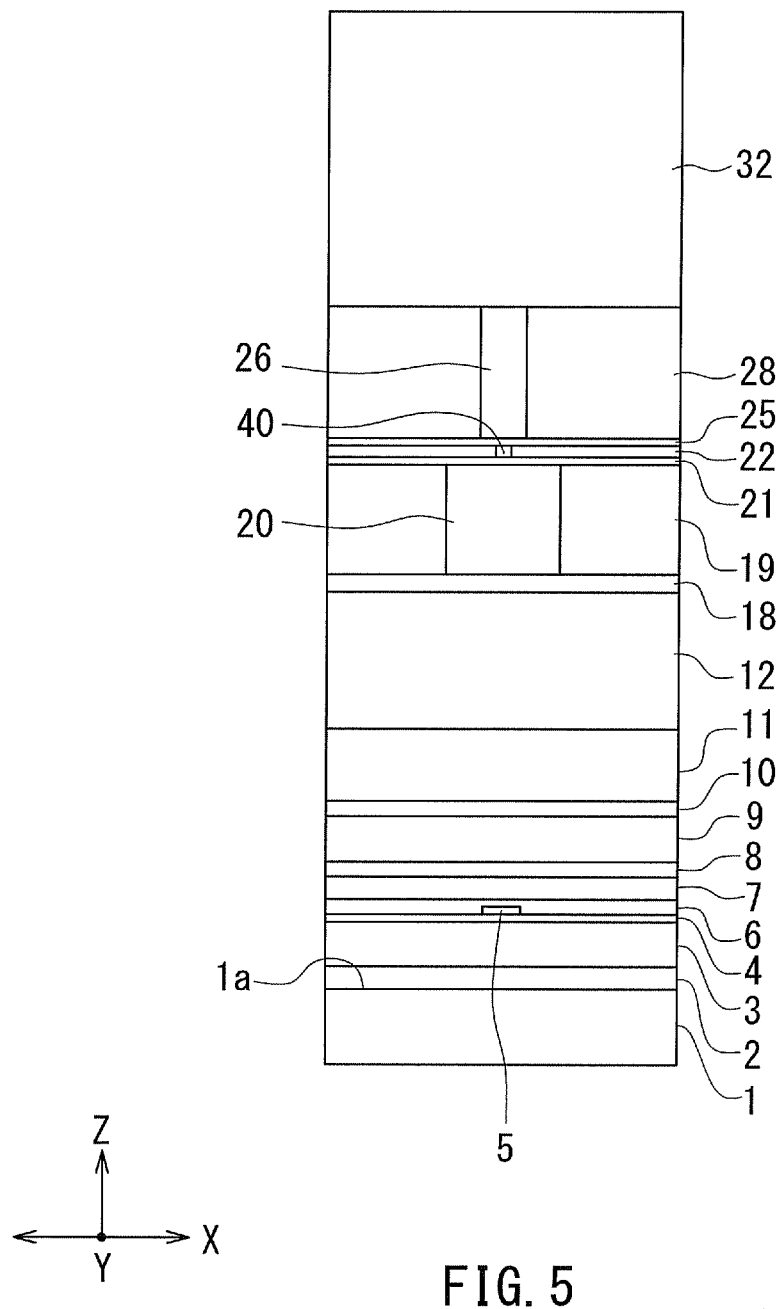
FIG. 5 is a front view showing the medium facing surface of the thermally-assisted magnetic recording head according to the first embodiment of the invention.

Preferred embodiments of the present invention will now be described in detail with reference to the drawings. First, reference is made to FIG. 4 and FIG. 5 to describe the configuration of a thermally-assisted magnetic recording head according to a first embodiment of the invention. FIG. 4 is a cross-sectional view showing the configuration of the thermally-assisted magnetic recording head. FIG. 5 is a front view showing the medium facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 4, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 4 and FIG. 5, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, and a nonmagnetic layer 10 formed of a nonmagnetic material and disposed on the middle shield layer 9. The insulating layer 8 and the nonmagnetic layer 10 are formed of alumina, for example.

The thermally-assisted magnetic recording head further includes a return pole layer 11 formed of a magnetic material and disposed on the nonmagnetic layer 10, and an insulating layer (not illustrated) disposed on the nonmagnetic layer 10 and surrounding the return pole layer 11. The return pole layer 11 has an end face located in the medium facing surface 60. The non-illustrated insulating layer is formed of alumina, for example.

The thermally-assisted magnetic recording head further includes a shield layer 12 located close to the medium facing surface 60 and lying on a part of the return pole layer 11, a coupling layer 13 located away from the medium facing surface 60 and lying on another part of the return pole layer 11, an insulating layer 14 lying on the remaining part of the return pole layer 11 and on the non-illustrated insulating layer, and a coil 15 lying on the insulating layer 14. The shield layer 12 and the coupling layer 13 are each formed of a magnetic material. The shield layer 12 has an end face located in the medium facing surface 60. The coil 15 is planar spiral-shaped and wound around the coupling layer 13. The coil 15 is formed of a conductive material such as copper. The insulating layer 14 is formed of alumina, for example.

The thermally-assisted magnetic recording head further includes an insulating layer 16 disposed around the shield layer 12, the coupling layer 13 and the coil 15 and in the space between every adjacent turns of the coil 15, and two coupling portions 17A and 17B disposed on the coupling layer 13. The coupling portions 17A and 17B are each formed of a magnetic material. Each of the coupling portions 17A and 17B has a first layer located on the coupling layer 13, and a second and a third layer stacked in this order on the first layer. The first layer of the coupling portion 17A and the first layer of the coupling portion 17B are disposed to be aligned in the track width direction (the X direction). The insulating layer 16 is formed of alumina, for example.

The thermally-assisted magnetic recording head further includes a waveguide. The waveguide includes a core 20 through which light propagates, and a cladding provided around the core 20. The core 20 will be described in detail later.

The cladding includes cladding layers 18, 19, and 21. The cladding layer 18 is disposed over the shield layer 12, the coupling layer 13, the coil 15, and the insulating layer 16. The core 20 is disposed on the cladding layer 18. The cladding layer 19 is disposed on the cladding layer 18 and surrounds the core 20. The cladding layer 21 is disposed over the core 20 and the cladding layer 19.

The core 20 is formed of a dielectric material that transmits laser light to be used for generating near-field light. The laser light emitted from a laser diode (not illustrated) enters the core 20 and propagates through the core 20. The cladding layers 18, 19, and 21 are each formed of a dielectric material that has a refractive index lower than that of the core 20. For example, the core 20 may be formed of tantalum oxide such as $Ta_2O_5$ or silicon oxynitride (SiON), while the cladding layers 18, 19, and 21 may be formed of silicon dioxide ($SiO_2$) or alumina.

The first layers of the coupling portions 17A and 17B are embedded in the cladding layer 18. The second layers of the coupling portions 17A and 17B are embedded in the cladding layer 19. The second layer of the coupling portion 17A and the second layer of the coupling portion 17B are located on opposite sides of the core 20 in the track width direction (the X direction), each being at a distance from the core 20.

The thermally-assisted magnetic recording head further includes a main pole 26 disposed above the core 20 in the vicinity of the medium facing surface 60, and a plasmon generator 40 disposed between the core 20 and the main pole 26. The main pole 26 is formed of a magnetic metal material. The plasmon generator 40 is configured to excite surface plasmons on the principle to be described later. In the present embodiment, the whole of the plasmon generator 40 is formed of one of Au, Ag, Al, and Cu, for example. The plasmon generator 40 will be described in detail later.

The main pole 26 has an end face located in the medium facing surface 60. The main pole 26 may include a narrow portion and a wide portion, the narrow portion having the aforementioned end face and an end portion opposite to the end face, the wide portion being connected to the end portion of the narrow portion. The wide portion is greater than the narrow portion in width in the track width direction (the X direction).

The thermally-assisted magnetic recording head further includes a dielectric layer 22 lying on the cladding layer 21 and surrounding the plasmon generator 40, a dielectric layer 24 lying on the plasmon generator 40 and the dielectric layer 22, and an insulating film 25 disposed to cover the plasmon generator 40 and the dielectric layer 24. The dielectric layer 24 has a top surface, and an end face closest to the medium facing surface 60. The distance from the medium facing surface 60 to an arbitrary point on the aforementioned end face of the dielectric layer 24 decreases with decreasing distance from the arbitrary point to the top surface 1a of the substrate 1. The dielectric layer 24 has a maximum thickness in the range of 300 to 500 nm, for example. The insulating film 25 has a thickness in the range of, for example, 10 to 40 nm, preferably in the range of 15 to 25 nm. The dielectric layers 22 and 24 and the insulating film 25 are formed of $SiO_2$ or alumina, for example.

The main pole 26 is disposed on the insulating film 25. The third layers of the coupling portions 17A and 17B are embedded in the cladding layer 21, the dielectric layers 22 and 24 and the insulating film 25.

The thermally-assisted magnetic recording head further includes a coupling layer 27 formed of a magnetic material and disposed over the third layers of the coupling portions 17A and 17B and the insulating film 25, and a dielectric layer 28 disposed around the main pole 26 and the coupling layer 27. The top surfaces of the main pole 26, the coupling layer 27, and the dielectric layer 28 are even with each other. The dielectric layer 28 is formed of alumina, for example.

The thermally-assisted magnetic recording head further includes a coil 29 disposed on the dielectric layer 28, an insulating layer 30 disposed to cover the coil 29, and a yoke layer 31 formed of a magnetic material and disposed over the main pole 26, the coupling layer 27 and the insulating layer 30. The yoke layer 31 magnetically couples the main pole 26 and the coupling layer 27 to each other. The coil 29 is planar spiral-shaped and wound around a part of the yoke layer 31 that lies on the coupling layer 27. The coil 29 is formed of a conductive material such as copper. The insulating layer 30 is formed of alumina, for example.

The thermally-assisted magnetic recording head further includes a protective layer 32 disposed to cover the yoke layer 31. The protective layer 32 is formed of alumina, for example.

The parts from the return pole layer 11 to the yoke layer 31 constitute a write head unit. The coils 15 and 29 produce magnetic fields corresponding to data to be written on the recording medium 80. The shield layer 12, the return pole layer 11, the coupling layer 13, the coupling portions 17A and 17B, the coupling layer 27, the yoke layer 31, and the main pole 26 form a magnetic path for passing magnetic fluxes corresponding to the magnetic fields produced by the coils 15 and 29. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 26. The main pole 26 allows the magnetic flux corresponding to the magnetic field produced by the coil 15 and the magnetic flux corresponding to the magnetic field produced by the coil 29 to pass, and produces a write magnetic field for writing data on the recording medium 80 by means of a perpendicular magnetic recording system.

As has been described, the thermally-assisted magnetic recording head according to the present embodiment includes the medium facing surface 60, the read head unit, and the write head unit. The read head unit and the write head unit are stacked on the substrate 1. The write head unit is located on the front side in the direction of travel of the recording medium 80 (the Z direction), i.e., on the trailing side, relative to the read head unit.

The thermally-assisted magnetic recording head may include a protective film covering the medium facing surface 60. The protective film is formed of diamond-like-carbon (DLC) or $Ta_2O_5$, for example. The protective film is not an essential component of the thermally-assisted magnetic recording head and can be dispensed with.

The write head unit includes the coils 15 and 29, the main pole 26, the waveguide, the plasmon generator 40, and the insulating film 25. The waveguide includes the core 20 and the cladding. The cladding includes the cladding layers 18, 19, and 21. The main pole 26 is located on the front side in the direction of travel of the recording medium 80 (the Z direction) relative to the core 20. The main pole 26 and the plasmon generator 40 are aligned along the direction of travel of the recording medium 80. In the present embodiment, in particular, the plasmon generator 40 is disposed between the core 20 and the main pole 26. The insulating film 25 is disposed between the main pole 26 and the plasmon generator 40.

Figure 1:
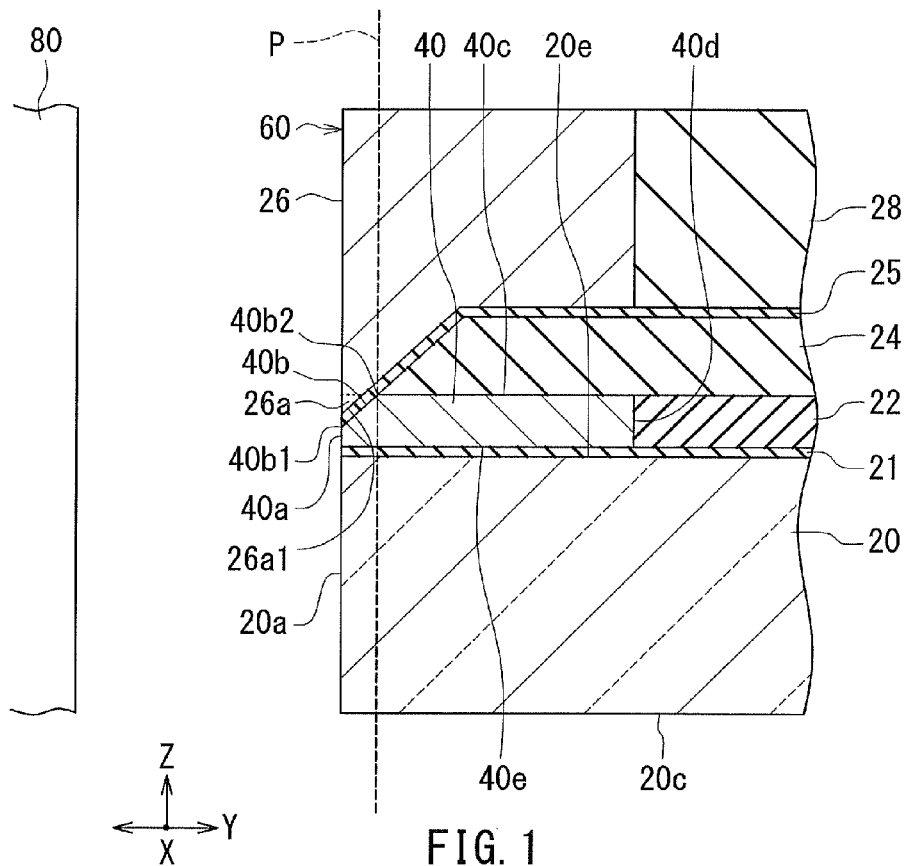
FIG. 1 is a cross-sectional view showing the main part of a thermally-assisted magnetic recording head according to a first embodiment of the invention.
Figure 2:
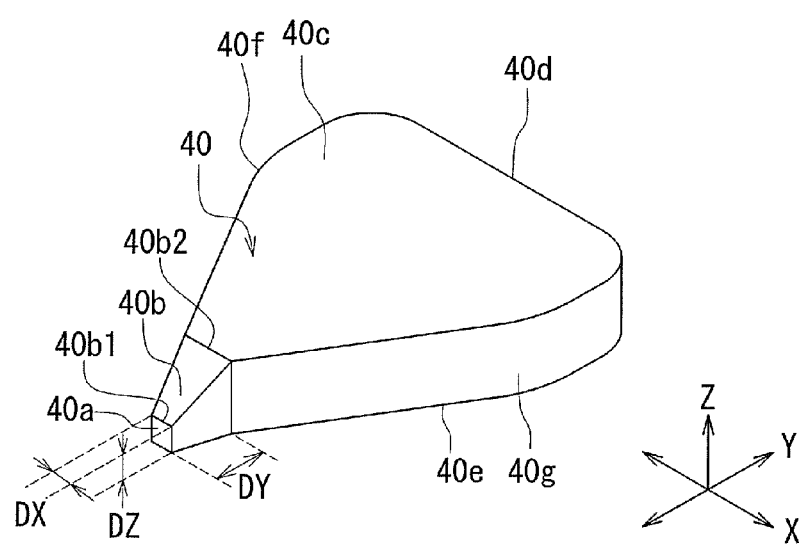
FIG. 2 is a perspective view showing a plasmon generator of the first embodiment of the invention.
Figure 3:
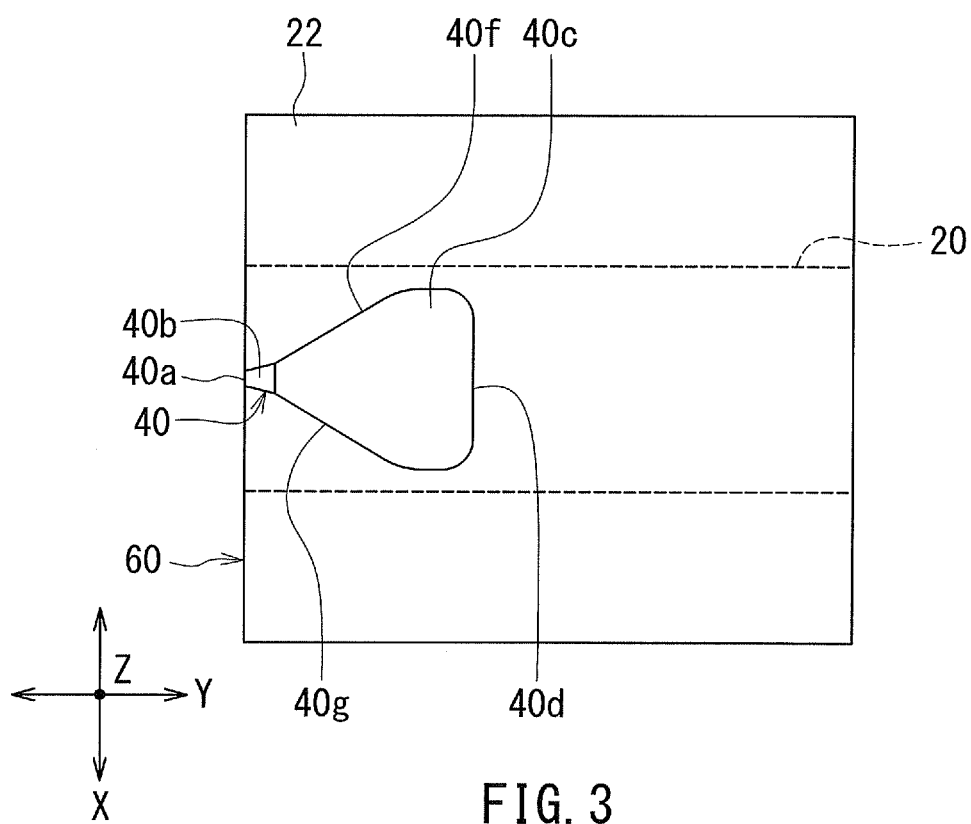
FIG. 3 is a plan view showing the positional relationship between the plasmon generator and the core of the waveguide shown in FIG. 1.

The core 20 and the plasmon generator 40 will now be described in detail with reference to FIG. 1 to FIG. 3. FIG. 1 is a cross-sectional view showing the main part of the thermally-assisted magnetic recording head according to the present embodiment. FIG. 2 is a perspective view showing the plasmon generator 40 of the present embodiment. FIG. 3 is a plan view showing the positional relationship between the plasmon generator 40 and the core 20 of the waveguide shown in FIG. 1.

As shown in FIG. 1, the core 20 has an end face 20a located in the medium facing surface 60, an evanescent light generating surface 20e or a top surface, a bottom surface 20c, and two side surfaces. The evanescent light generating surface 20e generates evanescent light based on the light propagating through the core 20. The cladding layer 21 covers the evanescent light generating surface 20e.

As shown in FIG. 1 and FIG. 2, the plasmon generator 40 has a front end face 40a located in the medium facing surface 60, and a first inclined surface 40b connected to the front end face 40a and facing toward the medium facing surface 60. The front end face 40a generates near-field light on the principle to be described later. The first inclined surface 40b is inclined relative to the direction perpendicular to the medium facing surface 60, and has a first edge 40b1 located in the medium facing surface 60 and a second edge 40b2 farthest from the medium facing surface 60. In the present embodiment, in particular, the first inclined surface 40b is inclined such that the second edge 40b2 is located on the front side in the direction of travel of the recording medium 80 relative to the first edge 40b1. The first inclined surface 40b forms an angle greater than 0°, preferably an angle in the range of 15° to 65°, more preferably 30° to 60°, relative to the front end face 40a.

As shown in FIG. 1, in a region between the medium facing surface 60 and a virtual plane P that passes through the second edge 40b2 and is parallel to the medium facing surface 60, the thickness of the plasmon generator 40 in the direction of travel of the recording medium 80 (the Z direction) increases with increasing distance from the medium facing surface 60. The maximum thickness of the plasmon generator 40 falls within the range of 80 to 300 nm, for example.

The plasmon generator 40 further has a top surface 40c connected to the second edge 40b2, a rear end face 40d, a core facing surface 40e or a bottom surface, and two side surfaces 40f and 40g. As shown in FIG. 1, the core facing surface 40e is opposed to the evanescent light generating surface 20e with a portion of the cladding, more specifically, a portion of the cladding layer 21 interposed therebetween. The distance between the core facing surface 40e and the evanescent light generating surface 20e, that is, the thickness of the cladding layer 21, is in the range of 10 to 100 nm, for example, and preferably falls within the range of 15 to 50 nm.

As shown in FIG. 2, the dimensions of the front end face 40a in the X direction and the Z direction will be represented by symbols DX and DZ, respectively. DX falls within the range of 20 to 40 nm, for example. DZ falls within the range of, for example, 20 to 80 nm, preferably within the range of 40 to 60 nm. The distance between the second edge 40b2 of the first inclined surface 40b and the medium facing surface 60 will be represented by symbol DY. DY falls within the range of 20 to 60 nm, for example.

As shown in FIG. 3, the plasmon generator 40 may include a portion whose width in the X direction decreases toward the front end face 40a.

As shown in FIG. 1, the main pole 26 includes an interposition part 26a interposed between the first inclined surface 40b and the medium facing surface 60. In FIG. 1, the boundary between the interposition part 26a and the remainder of the main pole 26 is shown by a dotted line. The interposition part 26a has a second inclined surface 26a1 that is opposed to the first inclined surface 40b with the insulating film 25 interposed therebetween. The second inclined surface 26a1 is inclined relative to the direction perpendicular to the medium facing surface 60.

Now, the principle of generation of near-field light in the present embodiment and the principle of thermally-assisted magnetic recording using the near-field light will be described in detail. Laser light emitted from a laser diode (not illustrated) enters the core 20. As shown in FIG. 4, the laser light 50 propagates through the core 20 toward the medium facing surface 60, and reaches the vicinity of the plasmon generator 40. In the core 20, the laser light 50 is totally reflected at the evanescent light generating surface 20e shown in FIG. 1, and this causes the evanescent light generating surface 20e to generate evanescent light permeating into the cladding layer 21. In the plasmon generator 40, surface plasmons are excited on the core facing surface 40e through coupling with the evanescent light. The surface plasmons propagate to the front end face 40a. As a result, the surface plasmons concentrate at the front end face 40a, and near-field light is generated from the front end face 40a based on the surface plasmons.

The near-field light generated from the front end face 40a is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 26 for data writing.

A method of manufacturing the thermally-assisted magnetic recording head according to the present embodiment will now be described. The method of manufacturing the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including rows of a plurality pre-head portions, the plurality of pre-head portions becoming individual thermally-assisted magnetic recording heads later; and cutting the substructure to separate the plurality of pre-head portions from each other and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will now be described in more detail with attention focused on a single thermally-assisted magnetic recording head. In the method of manufacturing the thermally-assisted magnetic recording head, the insulating layer 2, the bottom shield layer 3 and the bottom shield gap film 4 are first formed in this order on the substrate 1. Next, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Then, the return pole layer 11 is formed on the nonmagnetic layer 10. Next, an insulating layer (not illustrated) is formed to cover the return pole layer 11. The non-illustrated insulating layer is then polished by, for example, chemical mechanical polishing (hereinafter referred to as CMP), until the return pole layer 11 is exposed. Next, the insulating layer 14 is formed over the return pole layer 11 and the non-illustrated insulating layer. The insulating layer 14 is then selectively etched to form therein two openings for exposing the top surface of the return pole layer 11. In the positions of these two openings, the shield layer 12 and the coupling layer 13 are then formed on the return pole layer 11. Next, the coil 15 is formed on the insulating layer 14.

Next, the insulating layer 16 is formed over the entire top surface of the stack. The insulating layer 16 is then polished by, for example, CMP, until the shield layer 12, the coupling layer 13 and the coil 15 are exposed. Next, although not illustrated, the first layers of the coupling portions 17A and 17B are formed on the coupling layer 13. Then, the cladding layer 18 is formed over the entire top surface of the stack. The cladding layer 18 is then polished by, for example, CMP, until the first layers of the coupling portions 17A and 17B are exposed.

Next, a dielectric layer to become the core 20 is formed over the entire top surface of the stack. The dielectric layer is then etched in part by, for example, reactive ion etching (hereinafter referred to as RIE), and thereby patterned into the core 20. Next, although not illustrated, the second layers of the coupling portions 17A and 17B are formed on the first layers of the coupling portions 17A and 17B.

Next, the cladding layer 19 is formed over the entire top surface of the stack. The cladding layer 19 is then polished by, for example, CMP, until the core 20 and the second layers of the coupling portions 17A and 17B are exposed.

Reference is now made to FIG. 6A through FIG. 10B to describe steps to be performed after the polishing of the cladding layer 19 up to the formation of the dielectric layer 28. FIG. 6A through FIG. 10B each show a stack of layers formed in the process of manufacturing the thermally-assisted magnetic recording head. Note that portions located below the core 20 are omitted from FIG. 6A through FIG. 10B. FIG. 6A to FIG. 10A each show a cross section that intersects the end face of the main pole 26 and that is perpendicular to the medium facing surface 60 and the top surface 1a of the substrate 1. FIG. 6B to FIG. 10B each show a cross section of the stack taken at the position at which the medium facing surface 60 is to be formed. In FIG. 6A to FIG. 10A, the symbol "ABS" indicates the position at which the medium facing surface 60 is to be formed.

Figure 6A:
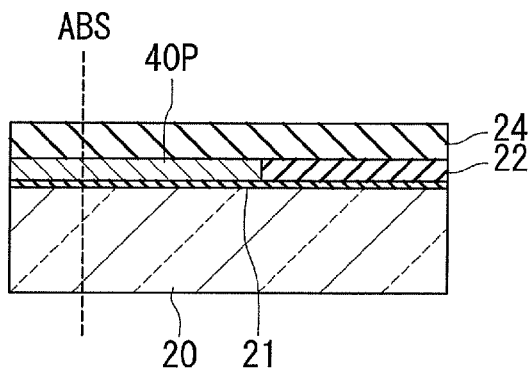
FIG. 6A and FIG. 6B are cross-sectional views showing a step of a method of manufacturing the thermally-assisted magnetic recording head according to the first embodiment of the invention.
Figure 6B:
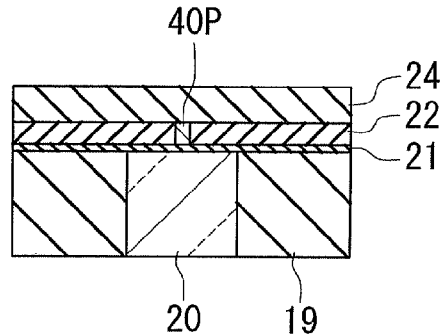

FIG. 6A and FIG. 6B show a step that follows the polishing of the cladding layer 19. In this step, first, the cladding layer 21 is formed over the core 20 and the cladding layer 19. Then, a metal film 40P, which later becomes the plasmon generator 40, is formed on the cladding layer 21 by sputtering, for example. Next, an etching mask, not illustrated, is formed to cover a portion to be the plasmon generator 40 of the metal film 40P. Using this etching mask, the metal film 40P is then etched in part by RIE, for example. The non-illustrated etching mask is then removed. Next, the dielectric layer 22 is formed over the entire top surface of the stack. The dielectric layer 22 is then polished by, for example, CMP, until the metal film 40P is exposed. The dielectric layer 24 is then formed over the metal film 40P and the dielectric layer 22.

Figure 7A:
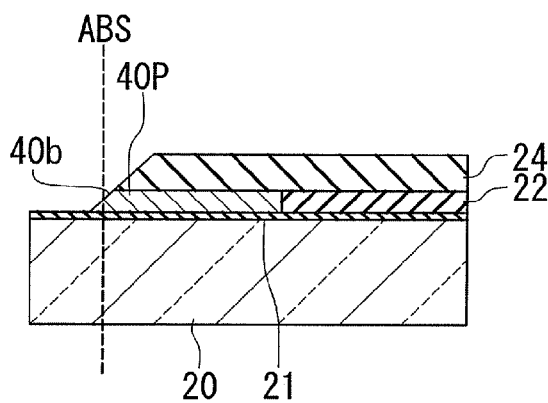
FIG. 7A and FIG. 7B are cross-sectional views showing a step that follows the step shown in FIG. 6A and FIG. 6B.
Figure 7B:
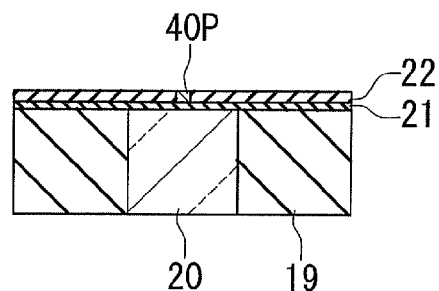
Figure 8A:
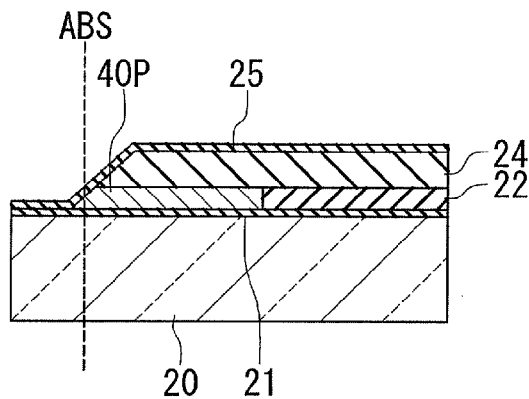
FIG. 8A and FIG. 8B are cross-sectional views showing a step that follows the step shown in FIG. 7A and FIG. 7B.
Figure 8B:
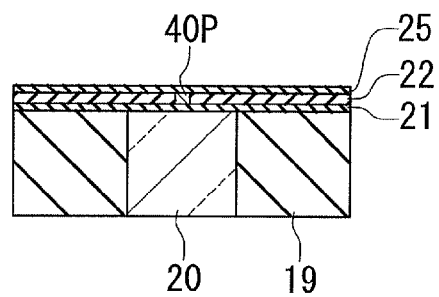

FIG. 7A and FIG. 7B show the next step. In this step, first, an etching mask (not illustrated) is formed on the dielectric layer 24. Using this etching mask, the dielectric layer 24 and the metal film 40P are then taper-etched by, for example, ion beam etching, whereby the metal film 40P is provided with a slope including the first inclined surface 40b. The slope intersects the position ABS at which the medium facing surface 60 is to be formed. The non-illustrated etching mask is then removed. Next, as shown in FIG. 8A and FIG. 8B, the insulating film 25 is formed to cover the metal film 40P and the dielectric layer 24.

Figure 9A:
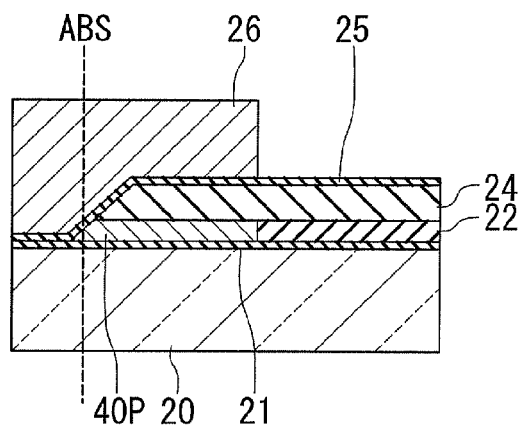
FIG. 9A and FIG. 9B are cross-sectional views showing a step that follows the step shown in FIG. 8A and FIG. 8B.
Figure 9B:
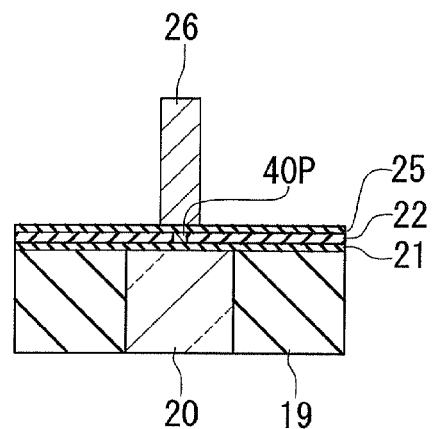

FIG. 9A and FIG. 9B show the next step. In this step, first, the cladding layer 21, the dielectric layers 22 and 24 and the insulating film 25 are selectively etched to form therein two openings for exposing the respective top surfaces of the second layers of the coupling portions 17A and 17B. Next, the third layers of the coupling portions 17A and 17B are formed on the second layers of the coupling portions 17A and 17B, respectively. Then, the main pole 26 is formed on the insulating film 25, and the coupling layer 27 is formed on the third layers of the coupling portions 17A and 17B and the insulating film 25.

Figure 10A:
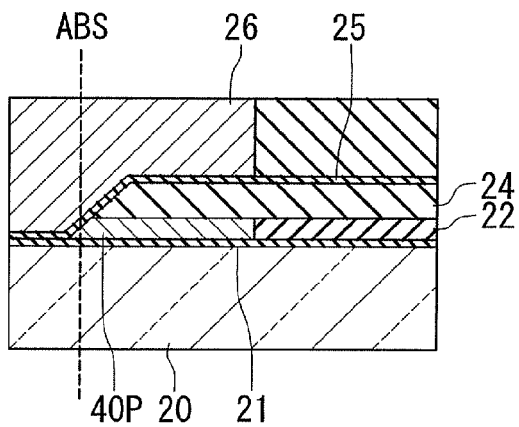
FIG. 10A and FIG. 10B are cross-sectional views showing a step that follows the step shown in FIG. 9A and FIG. 9B.
Figure 10B:
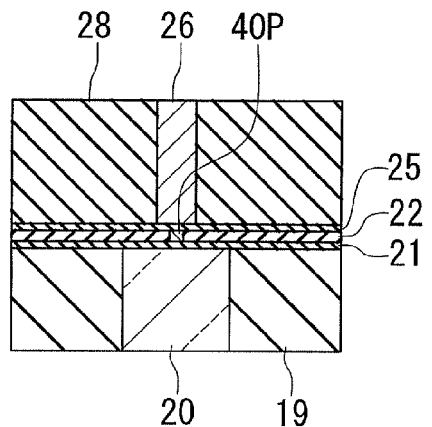

FIG. 10A and FIG. 10B show the next step. In this step, first, the dielectric layer 28 is formed over the entire top surface of the stack. The dielectric layer 28 is then polished by, for example, CMP, until the main pole 26 and the coupling layer 27 are exposed. The top surfaces of the main pole 26, the coupling layer 27 and the dielectric layer 28 are thereby made even with each other.

Now, steps to follow the step of FIG. 10A and FIG. 10B will be described with reference to FIG. 4 and FIG. 5. First, the coil 29 is formed on the dielectric layer 28. The insulating layer 30 is then formed to cover the coil 29. Next, the yoke layer 31 is formed over the main pole 26, the coupling layer 27 and the insulating layer 30. Then, the protective layer 32 is formed to cover the yoke layer 31. Wiring, terminals, and other components are then formed on the top surface of the protective layer 32. When the substructure is completed thus, the step of forming the medium facing surface 60 is performed. By forming the medium facing surface 60, the front end face 40a is formed and the metal film 40P thereby becomes the plasmon generator 40. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

In the aforementioned polishing step, the layers exposed in the medium facing surface 60 may be polished in different amounts due to differences between materials used for those layers, and this may cause irregularities on the medium facing surface 60.

Further, in the aforementioned polishing step, polishing residues of the metal materials may grow to cause smears. In order to remove the smears, the step of forming the medium facing surface 60 may include the step of etching the polished surface slightly by, for example, ion beam etching, after the polishing step.

The effects of the thermally-assisted magnetic recording head according to the present embodiment will now be described. In the present embodiment, the plasmon generator 40 has the first inclined surface 40b connected to the front end face 40a and facing toward the medium facing surface 60. The first inclined surface 40b has the first edge 40b1 located in the medium facing surface 60 and the second edge 40b2 farthest from the medium facing surface 60. In the region between the medium facing surface 60 and the virtual plane P that passes through the second edge 40b2 and is parallel to the medium facing surface 60, the thickness of the plasmon generator 40 in the direction of travel of the recording medium 80 increases with increasing distance from the medium facing surface 60. The present embodiment thus allows the plasmon generator 40 to be large in volume and surface area to thereby suppress a temperature rise of the plasmon generator 40, while allowing the front end face 40a of the plasmon generator 40 to be small in area to thereby prevent the front end face 40a from being damaged. The suppression of the temperature rise of the plasmon generator 40 is possible for the following two reasons. One of the reasons is that the increased volume of the plasmon generator 40 increases the heat capacity of the plasmon generator 40. The other reason is that the increased surface area of the plasmon generator 40 facilitates dissipation of heat from the plasmon generator 40.

Further, in the present embodiment, the main pole 26 includes the interposition part 26a interposed between the first inclined surface 40b of the plasmon generator 40 and the medium facing surface 60. It is thus possible, with the main pole 26 including the interposition part 26a, to facilitate dissipation of heat from a portion near the front end face 40a of the plasmon generator 40 which particularly tends to become hot. Further, the present embodiment allows the interposition part 26a to protect the portion near the front end face 40a of the plasmon generator 40.

As can be seen from the foregoing, the present embodiment offers increased reliability of the plasmon generator 40. More specifically, the present embodiment makes it possible to prevent the plasmon generator 40 from being deformed or damaged, and the front end face 40a from being significantly recessed relative to the other parts of the medium facing surface 60 during the step of forming the medium facing surface 60 or due to a temperature change of the plasmon generator 40. The present embodiment thus makes it possible to prevent the plasmon generator 40 from being degraded in heating performance.

Second Embodiment

Figure 11:
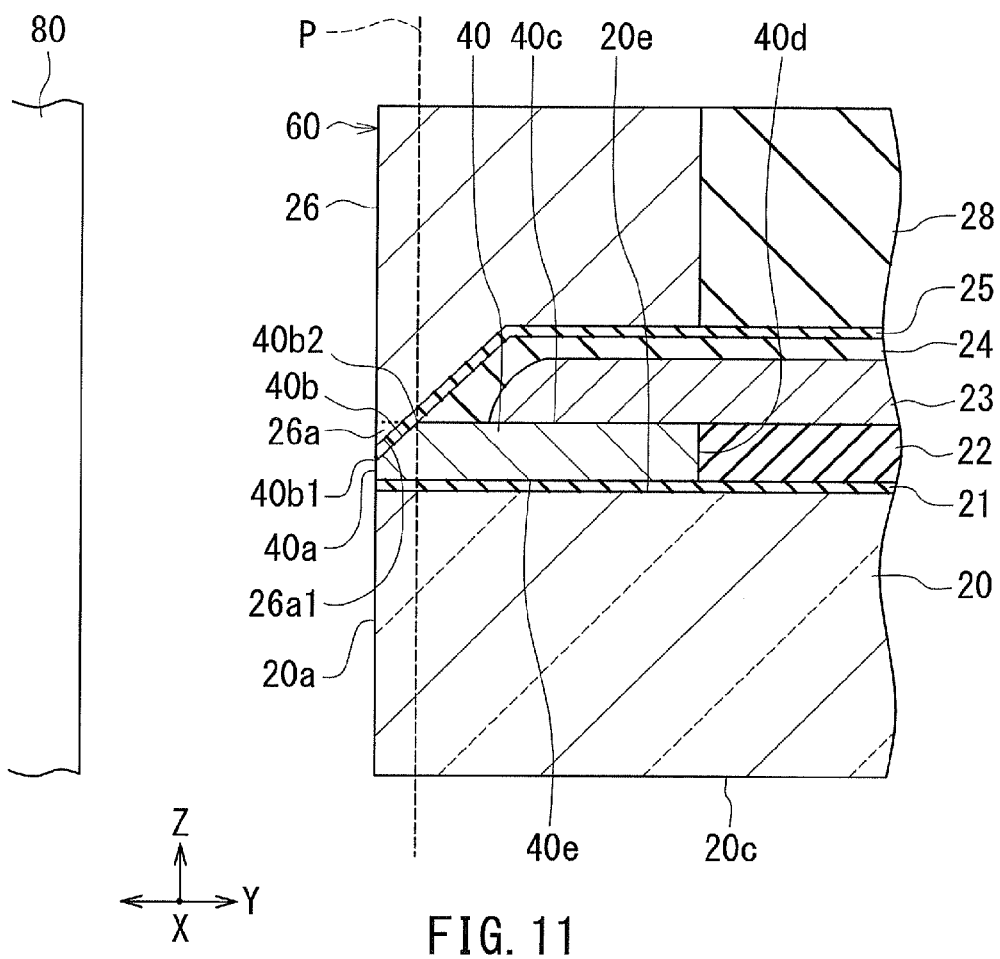
FIG. 11 is a cross-sectional view showing the main part of a thermally-assisted magnetic recording head according to a second embodiment of the invention.

A thermally-assisted magnetic recording head according to a second embodiment of the invention will now be described with reference to FIG. 11. FIG. 11 is a cross-sectional view showing the main part of the thermally-assisted magnetic recording head according to the present embodiment. The thermally-assisted magnetic recording head according to the present embodiment includes a heat sink 23 lying astride part of the plasmon generator 40 and part of the dielectric layer 22. The dielectric layer 24 is disposed to cover the heat sink 23. The heat sink 23 has a maximum thickness in the range of 100 to 200 nm, for example. The heat sink 23 is formed of a material having a high thermal conductivity, such as Au, Ag, Al, or Cu. The heat sink 23 has the function of dissipating heat generated at the plasmon generator 40. The present embodiment thus makes it possible to facilitate dissipation of heat from the plasmon generator 40 more effectively.

The remainder of configuration, function and effects of the present embodiment are similar to those of the first embodiment.

Third Embodiment

Figure 12:
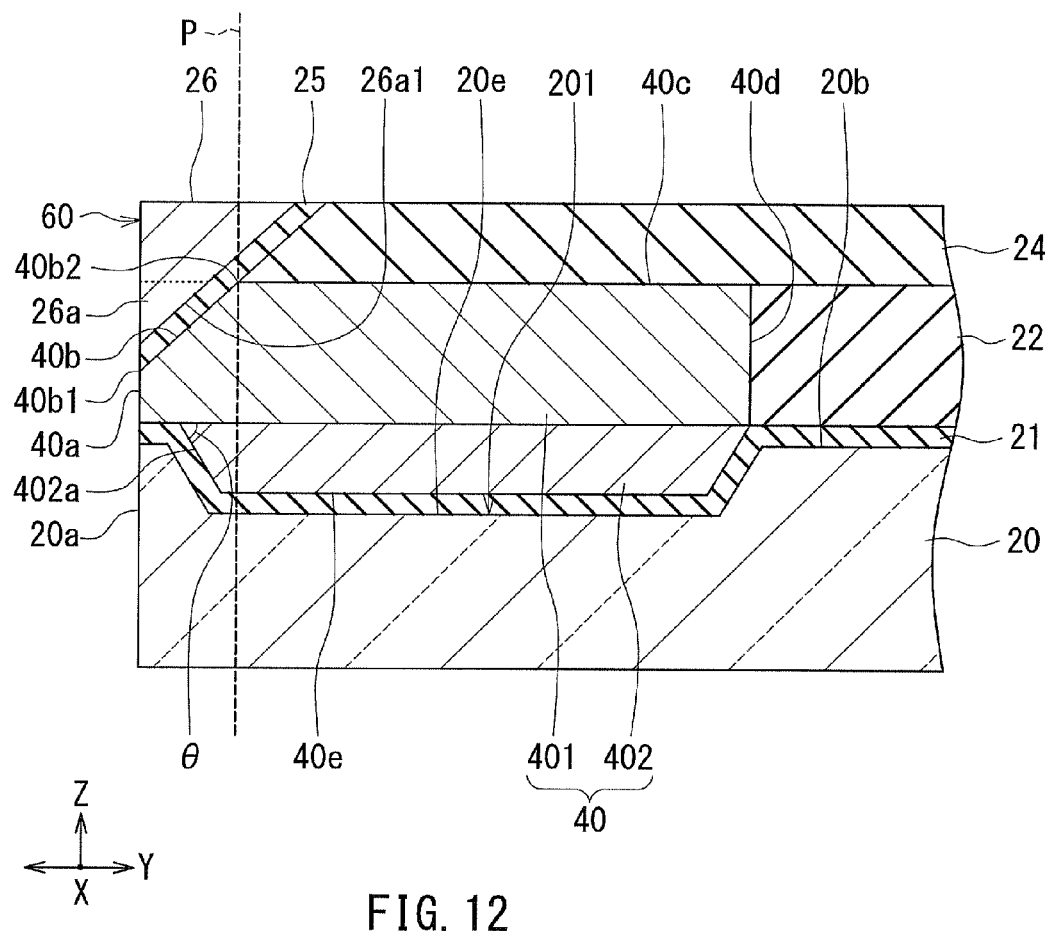
FIG. 12 is a cross-sectional view showing the main part of a thermally-assisted magnetic recording head according to a third embodiment of the invention.

A thermally-assisted magnetic recording head according to a third embodiment of the invention will now be described with reference to FIG. 12. FIG. 12 is a cross-sectional view showing the main part of the thermally-assisted magnetic recording head according to the present embodiment.

The differences of the thermally-assisted magnetic recording head according to the present embodiment from the head according to the first embodiment will now be described. In the present embodiment, as shown in FIG. 12, the core 20 has an end face 20a located in the medium facing surface 60, a top surface 20b, a bottom surface 20c (see FIG. 4), and two side surfaces. Further, the core 20 has a recess 201 that opens in the top surface 20b. The recess 201 is located in the vicinity of the end face 20a. The cladding layer 21 covers the top surface 20b and the recess 201 of the core 20. In the present embodiment, the evanescent light generating surface 20e is formed by the bottom surface of the recess 201. The evanescent light generating surface 20e is perpendicular to the Z direction, for example.

The plasmon generator 40 of the present embodiment has a first portion 401 including the front end face 40a and the first inclined surface 40b, and a second portion 402 coupled to the first portion 401. The whole of each of the first and second portions 401 and 402 is formed of one of Au, Ag, Al and Cu, for example.

At least part of the second portion 402 is received in the recess 201 of the core 20 with the cladding layer 21 interposed between the second portion 402 and the core 20. In the present embodiment, the major part of the second portion 402 is received in the recess 201, and the top surface of the second portion 402 projects to be higher than the top surface 20b of the core 20 by the thickness of the cladding layer 21. The top surface of the second portion 402 and the top surface of a portion of the cladding layer 21 lying on the top surface 20b of the core 20 are even with each other. The first portion 401 lies astride the top surface of the second portion 402 and part of the top surface of the cladding layer 21. No part of the second portion 402 is exposed in the medium facing surface 60. The second portion 402 has a thickness in the range of, for example, 40 to 300 nm, preferably in the range of 100 to 200 nm. In the present embodiment, the core facing surface 40e is formed by the bottom surface of the second portion 402. The core facing surface 40e (the bottom surface of the second portion 402) is opposed to the evanescent light generating surface 20e with a portion of the cladding layer 21 interposed therebetween.

The second portion 402 has an end face 402a lying at an end in the Y direction and closest to the medium facing surface 60 and the front end face 40a. The end face 402a may be perpendicular to the Y direction or inclined relative to the XZ plane. Where the end face 402a is inclined relative to the XZ plane, the end face 402a forms an angle θ of smaller than 90° relative to the interface between the second portion 402 and the first portion 401. In this case, the distance from the medium facing surface 60 to an arbitrary point on the end face 402a decreases with decreasing distance from the arbitrary point to the first portion 401. FIG. 12 shows an example in which the angle θ is smaller than 90°.

The first portion 401 has a shape similar to the overall shape of the plasmon generator 40 of the first embodiment. In the plasmon generator 40 of the present embodiment, surface plasmons are excited on the core facing surface 40e, i.e., the bottom surface of the second portion 402, through coupling with the evanescent light generated from the evanescent light generating surface 20e of the core 20. The surface plasmons propagate along the surface of the second portion 402 to the first portion 401, and further propagate along the surface of the first portion 401 to the front end face 40a. As a result, the surface plasmons concentrate at the front end face 40a, and the front end face 40a generates near-field light based on the surface plasmons.

As mentioned above, the plasmon generator 40 of the present embodiment includes the second portion 402, and no part of the second portion 402 is exposed on the medium facing surface 60. Accordingly, the material for the second portion 402 can be selected from any metal materials that have high electrical conductivities and are suitable for excitation and propagation of surface plasmons, without the need for considering mechanical strength. This allows appropriate excitation and propagation of surface plasmons on the second portion 402.

Where the end face 402a of the second portion 402 forms an angle θ of smaller than 90° relative to the interface between the second portion 402 and the first portion 401, the distance from the medium facing surface 60 to an arbitrary point on the end face 402a decreases with decreasing distance from the arbitrary point to the first portion 401. In this case, surface plasmons excited on the core facing surface 40e are able to propagate through the end face 402a to the vicinity of the front end face 40a. Further, where the angle θ is smaller than 90°, it is possible to reduce the loss of the surface plasmons as they propagate from the end face 402a to the first portion 401 when compared with the case where the angle θ is 90° or greater. Thus, where the angle θ is smaller than 90°, the surface plasmons excited on the core facing surface 40e are able to propagate to the first portion 401 more efficiently. The above-described effect obtained where the angle θ is smaller than 90° becomes smaller as the angle θ approaches 90°. On the other hand, if the angle θ is excessively small, it becomes difficult to form the end face 402a. In view of this, the angle θ is preferably in the range of 45° to 85°, and more preferably in the range of 60° to 75°.

The heat sink 23 may be provided as in the second embodiment. The remainder of configuration, function and effects of the present embodiment are similar to those of the first or second embodiment.

Fourth Embodiment

Figure 13:
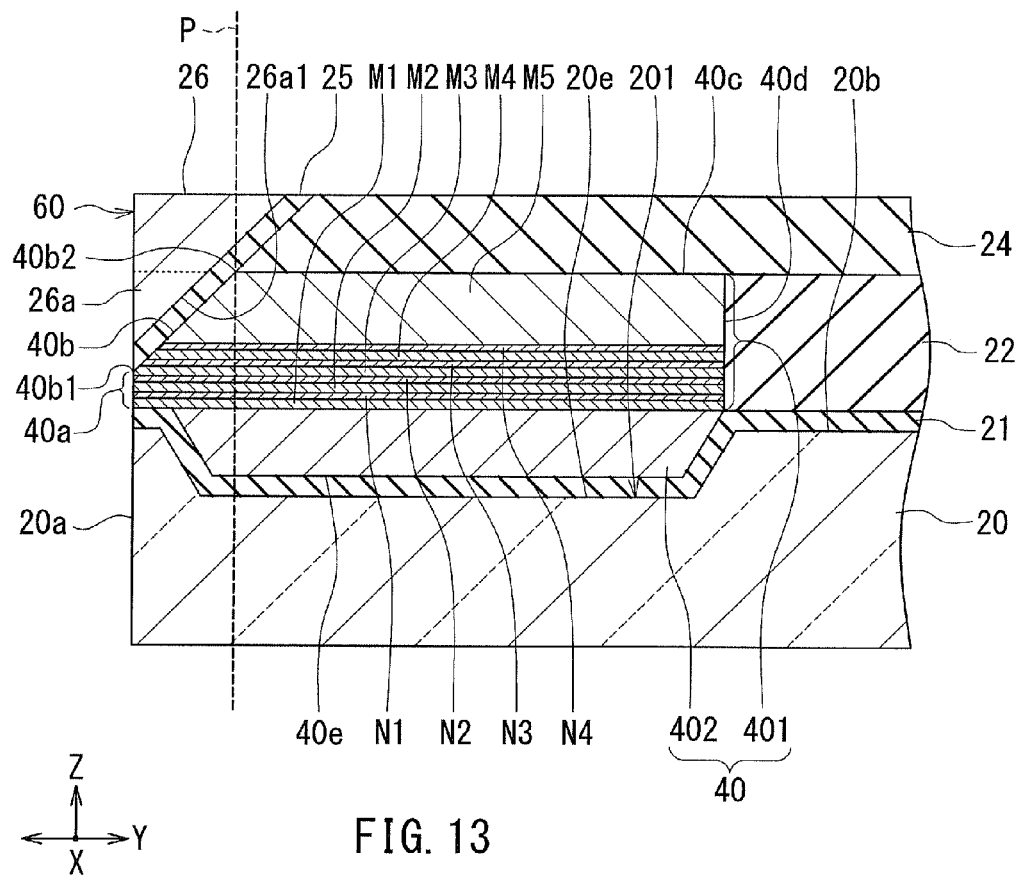
FIG. 13 is a cross-sectional view showing the main part of a thermally-assisted magnetic recording head according to a fourth embodiment of the invention.
Figure 14:
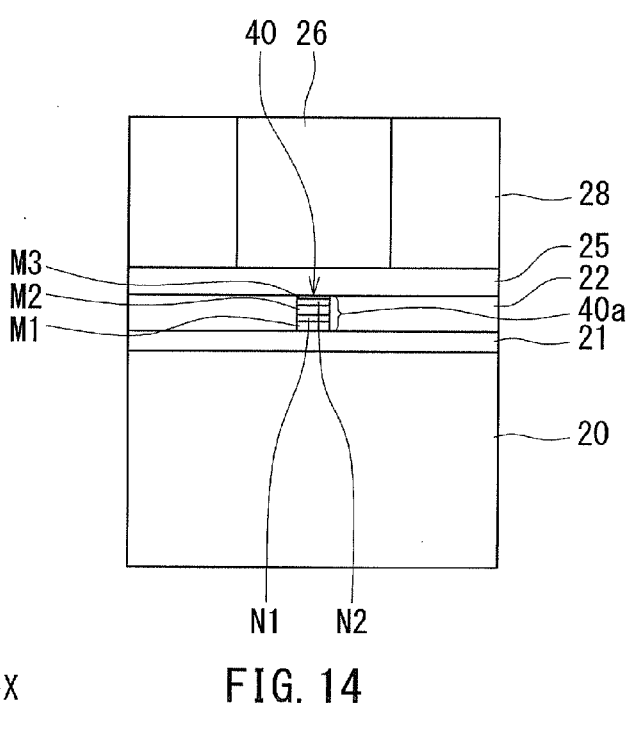
FIG. 14 is a front view showing part of the medium facing surface of the thermally-assisted magnetic recording head according to the fourth embodiment of the invention.

Reference is now made to FIG. 13 and FIG. 14 to describe a thermally-assisted magnetic recording head according to a fourth embodiment of the invention. FIG. 13 is a cross-sectional view showing the main part of the thermally-assisted magnetic recording head according to the present embodiment. FIG. 14 is a front view showing part of the medium facing surface of the thermally-assisted magnetic recording head according to the present embodiment. The configuration of the thermally-assisted magnetic recording head according to the present embodiment, except the plasmon generator 40, is the same as that of the head according to the third embodiment.

The first portion 401 of the plasmon generator 40 of the present embodiment includes at least a first metal layer M1, a second metal layer M2, and an intermediate layer N1. The intermediate layer N1 is interposed between the first metal layer M1 and the second metal layer M2. Each of the first metal layer M1, the second metal layer M2 and the intermediate layer N1 has an end located in the front end face 40a. Each of the first and second metal layers M1 and M2 is formed of a metal material. The intermediate layer N1 is formed of a material that is higher in Vickers hardness than the metal material used to form the first metal layer M1 and the metal material used to form the second metal layer M2. FIG. 13 shows an example in which the intermediate layer N1 is formed of a metal material different from the metal material used to form the first metal layer M1 and the metal material used to form the second metal layer M2. Hereinafter, the metal material used to form the first metal layer M1 and the metal material used to form the second metal layer M2 will each be referred to as a first-type metal material, and the metal material used to form the intermediate layer N1 will be referred to as a second-type metal material. The second-type metal material is higher in Vickers hardness than the first-type metal material. The first-type metal material is preferably higher in electrical conductivity than the second-type metal material.

In the example shown in FIG. 13, the first metal layer M1, the intermediate layer N1 and the second metal layer M2 are stacked in this order on the second portion 402. The first metal layer M1 lies astride the top surface of the second portion 402 and part of the top surface of the cladding layer 21. The second portion 402 is thus in contact with the first metal layer M1.

In the example shown in FIG. 13, the first portion 401 of the plasmon generator 40 further includes a second intermediate layer N2, a third metal layer M3, a third intermediate layer N3, a fourth metal layer M4, a fourth intermediate layer N4, and a fifth metal layer M5 stacked in this order on the second metal layer M2. The metal layers M3 to M5 are each formed of the first-type metal material. The intermediate layers N2 to N4 are each formed of the second-type metal material. The intermediate layer N2 has an end located in the front end face 40a. The metal layer M3 has an end located in the front end face 40a and an end located in the first inclined surface 40b. Each of the metal layers M4 and M5 and the intermediate layers N3 and N4 has an end located in the first inclined surface 40b. The stack of the metal layers M1 to M5 and the intermediate layers N1 to N4, that is, the first portion 401, has a shape similar to the overall shape of the plasmon generator 40 of the first embodiment.

The first-type metal material may be one of Au, Ag, Al, and Cu, for example. The second-type metal material may be one of Ru, Pt, Pd, Zr, Ti, Ta, Ni, W, Cr, NiCr, Cu, TiW, TiN, Mo, and Hf, for example. When the first-type metal material is Cu, the second-type metal material is other than Cu.

As far as the requirement that the second-type metal material be higher in Vickers hardness than the first-type metal material is satisfied, the materials used to form the metal layers M1 to M5 may all be the same or may be different from each other, or some of them may be the same. Likewise, the materials used to form the intermediate layers N1 to N4 may all be the same or may be different from each other, or some of them may be the same.

For example, the first metal layer M1, the intermediate layer N1, and the second metal layer M2 may be formed of Au, Ru, and Au, respectively, or of Au, Ru, and Cu, respectively.

The first metal layer M1 may be greater in thickness than the second metal layer M2. The intermediate layers N1 to N4 may be smaller in thickness than the metal layers M1 to M4. The thickness of the first metal layer M1 falls within the range of 5 to 20 nm, for example. The thickness of each of the metal layers M2 to M4 falls within the range of 5 to 10 nm, for example. The thickness of each of the intermediate layers N1 to N4 falls within the range of 0.3 to 5 nm, for example.

The metal layer M5 may be greater in thickness than the metal layers M1 to M4. The thickness of the metal layer M5 falls within the range of 5 to 200 nm, for example.

In the plasmon generator 40 of the present embodiment, surface plasmons are excited on the core facing surface 40e, i.e., the bottom surface of the second portion 402, through coupling with the evanescent light generated from the evanescent light generating surface 20e of the core 20. The surface plasmons propagate along the surface of the second portion 402 to the first metal layer M1, and further propagate along the surface of the first metal layer M1 to the front end face 40a. As a result, the surface plasmons concentrate at the front end face 40a, and the front end face 40a generates near-field light based on the surface plasmons.

The surface plasmons excited on the core facing surface 40e propagate to at least the end of the first metal layer M1 located in the front end face 40a. In the present embodiment, the intermediate layers N1 to N4 are each formed of a metal material. Therefore, the surface plasmons having propagated from the core facing surface 40e to the end of the first metal layer M1 can also propagate to the respective ends of the metal layers M2 and M3 and the intermediate layers N1 and N2 located in the front end face 40a. To allow the front end face 40a to generate near-field light of sufficient intensity, the surface plasmons having propagated from the core facing surface 40e to the end of the first metal layer M1 preferably propagate to at least the end of the second metal layer M2.

The effects of the thermally-assisted magnetic recording head according to the present embodiment will now be described. The first portion 401 of the plasmon generator 40 of the present embodiment includes at least the first metal layer M1, the second metal layer M2, and the intermediate layer N1. The intermediate layer N1 is interposed between the first metal layer M1 and the second metal layer M2. The intermediate layer N1 is formed of a material that is higher in Vickers hardness than the metal material used to form the first metal layer M1 and the metal material used to form the second metal layer M2. This makes it possible to prevent deformation of the first metal layer M1 and the second metal layer M2 sandwiching the intermediate layer N1. Further, the plasmon generator 40 of the present embodiment achieves higher mechanical strength as a whole when compared with a plasmon generator formed of a single metal layer of the first-type metal material. The foregoing features of the plasmon generator 40 of the present embodiment make it possible to more effectively prevent the plasmon generator 40 from being deformed or damaged, and the front end face 40a from being significantly recessed relative to the other parts of the medium facing surface 60 during the step of forming the medium facing surface 60 or due to a temperature change of the plasmon generator 40. Consequently, the present embodiment makes it possible to more effectively prevent the plasmon generator 40 from being degraded in heating performance.

Further, in the plasmon generator 40 of the present embodiment, each of the first metal layer M1, the second metal layer M2 and the intermediate layer N1 has an end located in the front end face 40a. This allows the surface plasmons excited on the core facing surface 40e to efficiently propagate to the front end face 40a.

As can be seen from the foregoing, the present embodiment offers further increased reliability of the plasmon generator 40.

The above-described effects are more noticeable where the first portion 401 of the plasmon generator 40 includes one or more pairs of an intermediate layer and a metal layer in addition to the first metal layer M1, the second metal layer M2 and the intermediate layer N1.

The plasmon generator 40 of the present embodiment provides additional effects as described below when configured so that a metal layer is sandwiched between two intermediate layers. A metal layer is typically formed of a metal polycrystal. In general, when a metal polycrystal gets hot, a plurality of crystal grains constituting the metal polycrystal aggregate and grow, and accordingly, the metal polycrystal may become deformed. If a metal layer is sandwiched between two intermediate layers, the metal layer is restrained to some extent by the two intermediate layers. In this case, it is thus possible to prevent the aggregation and growth of the plurality of crystal grains constituting the metal layer (the metal polycrystal) when the metal layer gets hot, and consequently, it is possible to prevent the metal layer from becoming deformed.

Where the first-type metal material is higher in electrical conductivity than the second-type metal material, the intermediate layers N1 and N2 are preferably smaller in thickness than the metal layers M1 to M3. In such a case, it is possible to reduce loss of surface plasmons when the surface plasmons propagate from the end of the metal layer M1 located in the front end face 40a to the respective ends of the metal layers M2 and M3 located in the front end face 40a.

The surface plasmons need not necessarily propagate to the end of the metal layer M3 located in the front end face 40a. Even in such a case, the metal layer M3 and the intermediate layer N2 contribute to the enhancement of the mechanical strength of a portion near the front end face 40a of the plasmon generator 40.

In the present embodiment, the first metal layer M1 is located closer to the core facing surface 40e than is the second metal layer M2. In this case, in order to allow appropriate excitation and propagation of surface plasmons on the first metal layer M1, the first metal layer M1 is preferably greater in thickness than the second metal layer M2.

The material used to form the intermediate layer N1 is not limited to a metal material. For example, the intermediate layer N1 may be formed of a dielectric material that is higher in Vickers hardness than the metal material used to form the first metal layer M1 and the metal material used to form the second metal layer M2. Similarly, each of the intermediate layers N2 to N4 may be formed of such a dielectric material. The dielectric material for forming the intermediate layers N1 to N4 may be $SiO_2$, alumina, MgO, $ZrO_2$, or amorphous SiC, for example.

The thicknesses of the intermediate layers N1 to N4 are sufficiently smaller than the wavelength of light propagating through the core 20. Thus, where each of the intermediate layers N1 to N4 is formed of a dielectric material, a transfer of energy occurs at least between the metal layers M1 and M2 which are adjacent to each other with the intermediate layer N1 interposed therebetween, and between the metal layers M2 and M3 which are adjacent to each other with the intermediate layer N2 interposed therebetween, so that surface plasmons are excited also on the surfaces of the metal layers M2 and M3. However, the energy of the surface plasmons excited on the surfaces of the metal layers M2 and M3 is lower than the energy of the surface plasmons excited on the core facing surface 40e.

The second portion 402 is not an essential component of the thermally-assisted magnetic recording head according to the present embodiment, and can be dispensed with. In such a case, the core facing surface 40e is formed by the bottom surface of the first metal layer M1.

The remainder of configuration, function and effects of the present embodiment are similar to those of the third embodiment.

Fifth Embodiment

Figure 15:
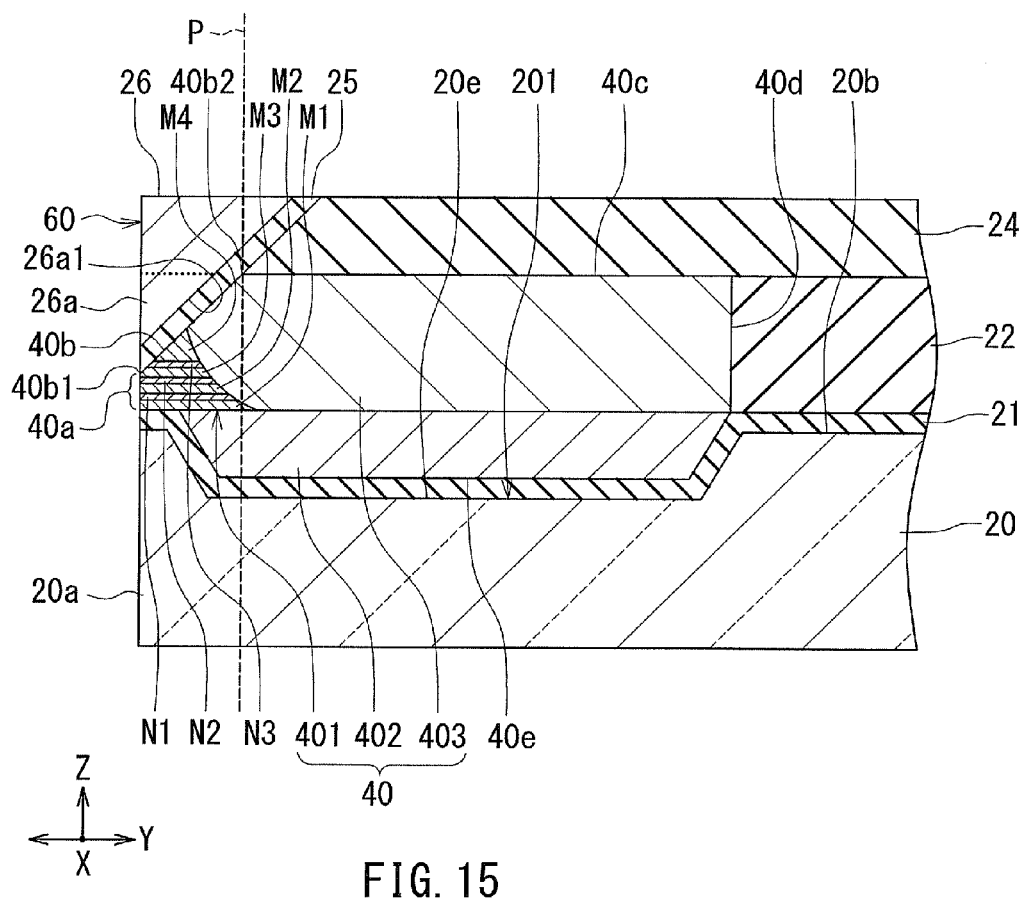
FIG. 15 is a cross-sectional view showing the main part of a thermally-assisted magnetic recording head according to a fifth embodiment of the invention.

A thermally-assisted magnetic recording head according to a fifth embodiment of the invention will now be described with reference to FIG. 15. FIG. 15 is a cross-sectional view showing the main part of the thermally-assisted magnetic recording head according to the present embodiment. The configuration of the thermally-assisted magnetic recording head according to the present embodiment, except the plasmon generator 40, is the same as that of the head according to the fourth embodiment.

In the plasmon generator 40 of the present embodiment, the first metal layer M1 of the first portion 401 lies on the top surface of the second portion 402 and a portion of the top surface of the cladding layer 21 near the front end face 40a. The intermediate layer N1, the metal layer M2, the intermediate layer N2, the metal layer M3, the intermediate layer N3, and the metal layer M4 are stacked in this order on the first metal layer M1. In the present embodiment, there are not provided the metal layer M5 and the intermediate layer N4.

The plasmon generator 40 of the present embodiment includes a third portion 403 in addition to the first portion 401 (the metal layers M1 to M4 and the intermediate layers N1 to N3) and the second portion 402. The third portion 403 lies on a portion of the top surface of the second portion 402 other than the portion on which the first metal layer M1 lies, and is in contact with the second portion 402. The metal layers M1 to M4 and the intermediate layers N1 to N3 are sandwiched between the third portion 403 and the front end face 40a. The third portion 403 has an end face facing toward the front end face 40a. This end face of the third portion 403 is in contact with respective ends of the metal layers M1 to M4 and the intermediate layers N1 to N3 that are opposite from the front end face 40a. No part of the third portion 403 is exposed in the medium facing surface 60. The third portion 403 has a maximum thickness greater than the total thickness of the metal layers M1 to M4 and the intermediate layers N1 to N3. The whole of the third portion 403 is formed of, for example, the first-type metal material described in the fourth embodiment section. A structure consisting of the first portion 401 (the metal layers M1 to M4 and the intermediate layers N1 to N3) and the third portion 403 has a shape similar to the overall shape of the plasmon generator 40 of the first embodiment.

In the example shown in FIG. 15, the end face of the third portion 403 facing toward the front end face 40a is inclined relative to the front end face 40a. Alternatively, however, this end face may be parallel to the front end face 40a.

The same effects as those provided by the fourth embodiment can also be obtained even when only a portion of the plasmon generator 40 in the vicinity of the front end face 40a has a multilayer structure as in the present embodiment.

The remainder of configuration, function and effects of the present embodiment are similar to those of the fourth embodiment.

The present invention is not limited to the foregoing embodiments, and various modifications may be made thereto. For example, as far as the requirements of the appended claims are met, the shape of the plasmon generator and the locations of the plasmon generator, the core and the main pole can be chosen as desired, without being limited to the examples illustrated in the foregoing embodiments. For example, the core may be located above the plasmon generator so as not to be exposed in the medium facing surface. In such a case, the bottom surface of the core serves as the evanescent light generating surface, and the top surface of the plasmon generator serves as the core facing surface.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
   a medium facing surface facing a recording medium;
   a main pole producing a write magnetic field for writing data on a recording medium;
   a waveguide including a core through which light propagates, and a cladding provided around the core;
   a plasmon generator configured to excite a surface plasmon based on the light propagating through the core; and
   an insulating film disposed between the main pole and the plasmon generator, wherein
   the main pole and the plasmon generator are aligned along a direction of travel of a recording medium,
   the plasmon generator has a front end face located in the medium facing surface, and a first inclined surface connected to the front end face and facing toward the medium facing surface,
   the front end face generates near-field light based on the surface plasmon,
   the first inclined surface is inclined relative to a direction perpendicular to the medium facing surface, and has a first edge located in the medium facing surface and a second edge farthest form the medium facing surface,
   in a region between the medium facing surface and a virtual plane that passes through the second edge and is parallel to the medium facing surface, a thickness of the plasmon generator in the direction of travel of a recording medium increases with increasing distance from the medium facing surface,
   the main pole includes an interposition part interposed between the first inclined surface and the medium facing surface,
   the interposition part has a second inclined surface that is opposed to the first inclined surface with the insulating film interposed therebetween, and
   the second inclined surface is inclined relative to the direction perpendicular to the medium facing surface.

2. The thermally-assisted magnetic recording head according to claim 1, wherein
   the core has an evanescent light generating surface that generates evanescent light based on the light propagating through the core, and
   the plasmon generator further has a core facing surface that is opposed to the evanescent light generating surface with a portion of the cladding interposed therebetween.

3. The thermally-assisted magnetic recording head according to claim 1, wherein the plasmon generator is disposed between the core and the main pole.

4. The thermally-assisted magnetic recording head according to claim 1, wherein
   the plasmon generator includes a first metal layer, a second metal layer, and an intermediate layer,
   the intermediate layer is interposed between the first metal layer and the second metal layer,
   each of the first metal layer, the second metal layer and the intermediate layer has an end located in the front end face,
   each of the first and second metal layers is formed of a metal material, and
   the intermediate layer is formed of a material that is higher in Vickers hardness than the metal material used to form the first metal layer and the metal material used to form the second metal layer.

5. The thermally-assisted magnetic recording head according to claim 1, wherein
   the plasmon generator has a first portion including the front end face and the first inclined surface, and a second portion coupled to the first portion, and
   no part of the second portion is exposed on the medium facing surface.

6. The thermally-assisted magnetic recording head according to claim 5, wherein
   the first portion includes a first metal layer, a second metal layer, and an intermediate layer,
   the intermediate layer is interposed between the first metal layer and the second metal layer,
   each of the first metal layer, the second metal layer and the intermediate layer has an end located in the front end face,
   each of the first and second metal layers is formed of a metal material, and
   the intermediate layer is formed of a material that is higher in Vickers hardness than the metal material used to form the first metal layer and the metal material used to form the second metal layer.

* * * * *